United States Patent
Na et al.

(10) Patent No.: US 8,406,353 B1
(45) Date of Patent: Mar. 26, 2013

(54) SIGNAL SEQUENCE DETECTION IN PRESENCE OF CARRIER OR NARROW BAND TRANSMISSIONS

(75) Inventors: Yanxin Na, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 921 days.

(21) Appl. No.: 12/504,919

(22) Filed: Jul. 17, 2009

(51) Int. Cl.
*H04L 27/06* (2006.01)

(52) U.S. Cl. ........ 375/343; 375/142; 375/143; 375/150; 375/152; 375/260; 375/316; 375/340; 375/342; 375/350; 370/210; 370/331; 370/344; 370/480; 341/173; 341/180; 455/130

(58) Field of Classification Search .................. 375/142, 375/143, 150, 152, 260, 316, 340, 342, 343, 375/350; 370/210, 331, 344, 480; 341/173, 341/180; 455/130
See application file for complete search history.

(56) References Cited

U.S. PATENT DOCUMENTS

| 7,450,673 | B2 | 11/2008 | Jin et al. |
| 7,991,083 | B2 | 8/2011 | Na et al. |
| 2007/0237113 | A1 * | 10/2007 | Akita et al. .................. 370/331 |

* cited by examiner

*Primary Examiner* — Leon Flores
(74) *Attorney, Agent, or Firm* — Edell, Shapiro & Finnan, LLC (57) ABSTRACT

Signal sequence detection techniques are provided to enable a wireless communication device to detect presence of a sequence, such as a preamble sequence, in the presence of other transmission that would otherwise interference with the ability of the device to detect the sequence. At the wireless communication device, energy in a frequency band is received and a receive signal is generated from the received energy. The receive signal is divided into windows of a predetermined time duration. A running auto-correlation of the receive signal is computed to produce an auto-correlation sequence for a sequence to be detected in the receive signal. Data representing a mask is generated for a window based on the receive signal. The mask is applied to the auto-correlation sequence to filter out portions of the auto-correlation sequence that are outside of the mask. A position of sequence, e.g., a preamble sequence, in the receive signal is detected based on a position of a peak in the auto-correlation sequence after application of the mask.

19 Claims, 9 Drawing Sheets

$Q = Q(1), Q(2), Q(3), \ldots \qquad\qquad\qquad\qquad Q(171)$ $\widehat{Q}$ IS PART OF Q DEPENDING ON FREQUENCY OFFSET

FIG.10

SIGNAL SEQUENCE DETECTION IN PRESENCE OF CARRIER OR NARROW BAND TRANSMISSIONS

TECHNICAL FIELD

The present disclosure relates to wireless communication devices and systems, and more particularly to detecting a signal with predetermined patterns in wireless transmissions.

BACKGROUND

In a wireless communication systems and networks, a transmitting device sends a transmission that includes a pattern to enable a receiving device to synchronize to the transmission in order to enable further reception and recovery of data from the received signal. A signal sequence or pattern, called a preamble, is included in a transmission to enable this synchronization process.

Preamble synchronization can be affected by the presence of other signals that occur in same frequency band and frame period as the preamble sequence. For example, carrier signals or DC signals, as well as other narrow band transmitted signals, can often be mistaken as a preamble sequence, particularly when the preamble sequence has a periodicity property that is similar to that of carrier signals or narrow band transmissions.

DESCRIPTION OF EXAMPLE EMBODIMENTS

Overview

Signal sequence detection techniques are provided to enable a wireless communication device to detect presence of a sequence, such as a preamble sequence, in the presence of other transmission that would otherwise interference with the ability of the device to detect the sequence. At the wireless communication device, energy in a frequency band is received and a receive signal is generated from the received energy. The receive signal is divided into windows of a predetermined time duration. A running auto-correlation of the receive signal is computed to produce an auto-correlation sequence for a sequence to be detected in the receive signal. Data representing a mask is generated for a window based on the receive signal. The mask is applied to the auto-correlation sequence to filter out portions of the auto-correlation sequence that are outside of the mask. A position of sequence, e.g., a preamble sequence, in the receive signal is detected based on a position of a peak in the auto-correlation sequence after application of the mask.

Example Embodiments

Figure 1:
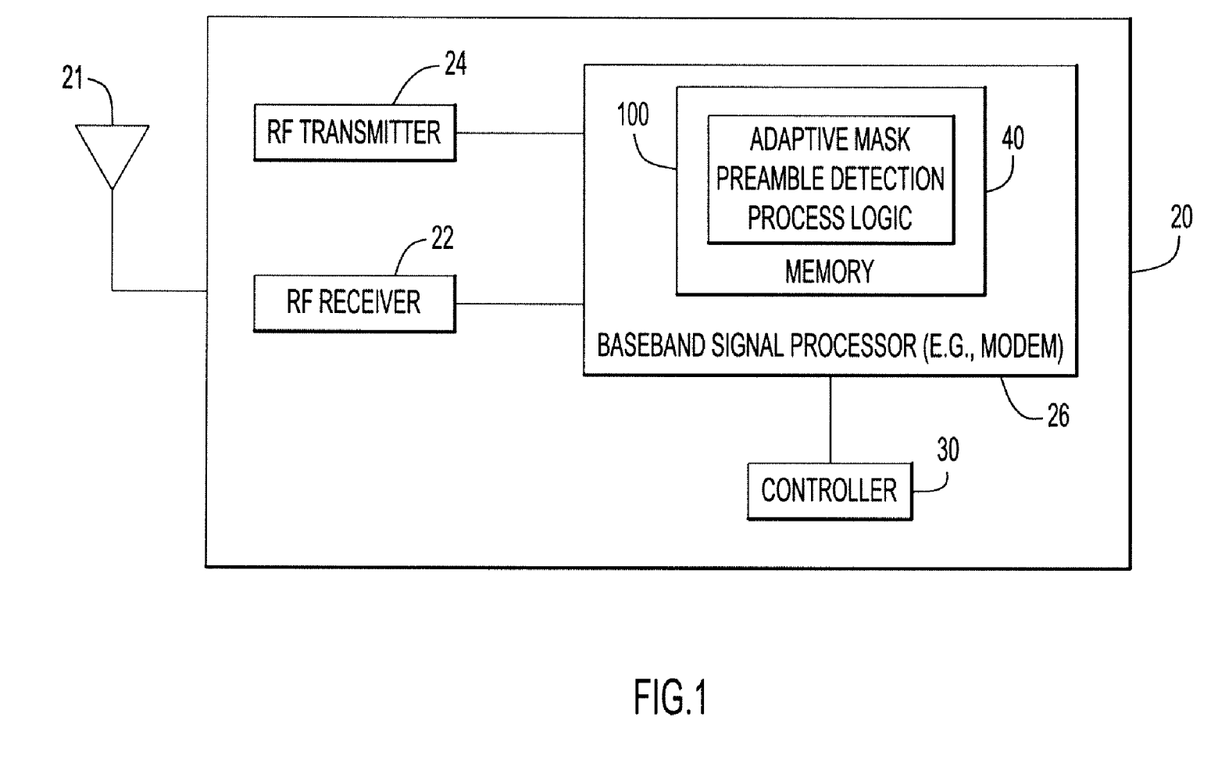
FIG. 1 is a block diagram of a wireless communication network in which wireless client devices are configured to detect a preamble sequence according to an adaptive mask preamble detection process.

Referring first to FIG. 1, an example of a block diagram of a wireless communication device 20 is shown. The device 20 is configured to perform an adaptive mask preamble detection process as described herein. The device comprises at least one antenna 21, a radio frequency (RF) receiver 22, an RF transmitter 24, a baseband signal processor or modem 26 and a controller 30. The receiver 22 downconverts received RF energy detected by the antenna 21 and produces a baseband receive signal. There are analog-to-digital converters (ADCs) between (or as part of either or both of) the receiver 22 and the modem 26 to convert the baseband receive signal to a digital signal for processing by the modem 26. Similarly, there are digital-to-analog converters (DACs) between (or as part of either or both of) the modem 26 and the transmitter 24 that convert a baseband transmit signal to an analog transmit signal for upconversion by the transmitter 24 and transmission via antenna 21.

The modem 26 may be implemented by a data processor, microprocessor, microcontroller, digital signal processor, application specific integrated circuit made up of digital logic gates, a programmable gate array device or other programmable or fixed logic device. Regardless of the specific implementation of the modem 26, it contains adaptive mask preamble detection process logic 100. To reiterate, the logic 100 may be embodied as logic encoded in one or more tangible media for execution and when executed, operable to perform functions described in further detail hereinafter. The logic 100 may be implemented in fixed or programmable digital logic gates or by software instructions stored in one or more memory media, e.g., memory 40 shown in FIG. 1, that when executed by a processor or computer, cause the processor or computer to perform the functions described herein.

The controller 30 is, for example, a data processor, e.g., a microprocessor or microcontroller, that performs higher level control functions for the device 20. The logic 100 may be performed completely by the modem 26, or partly by the modem 26 and partly by the controller 30, or entirely by the controller 30. The device 20 may be a wireless client device or a wireless base station device in a wireless network, such as in a WiMAX™ network or in a WiFi™ network. To this end, the modem 26 is configured to apply the appropriate modulation and packet format to a transmission and likewise to recover and demodulate a received transmission according to the rules of the communication protocol employed.

Figure 2:
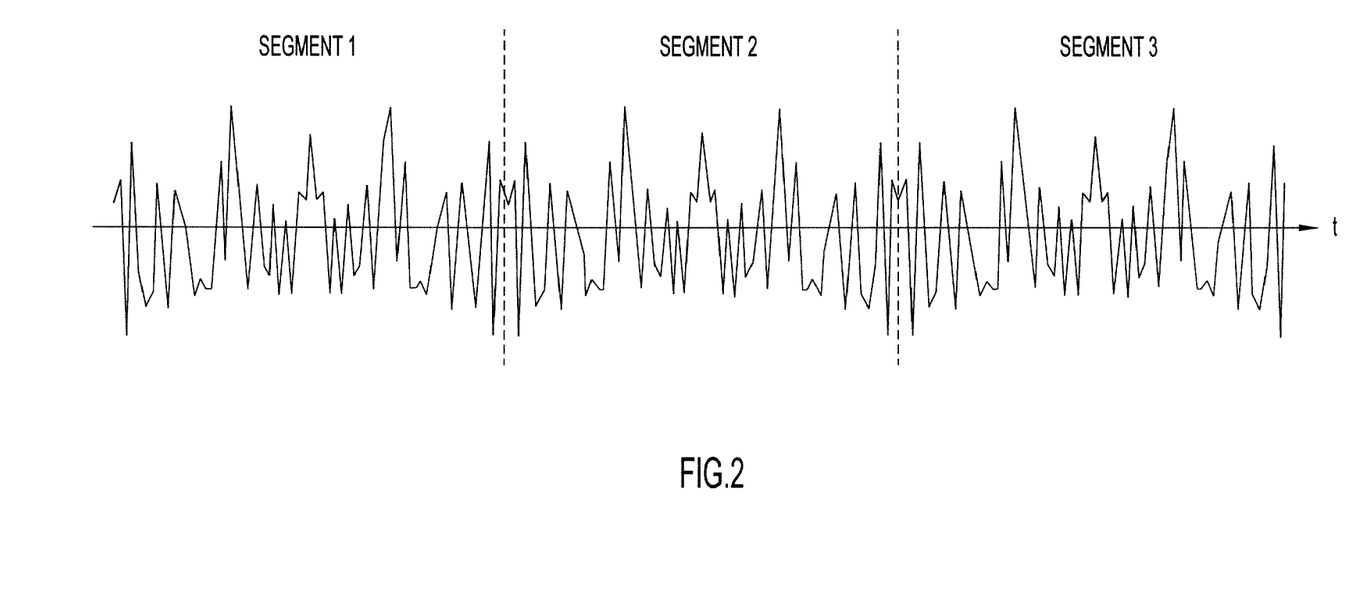
FIG. 2 is a plot showing a periodic nature of a preamble sequence in the time domain.

In a wireless communication network or system that employs synchronization of a device to a received signal, a preamble sequence is used to enable such synchronization. In some configurations, a preamble sequence has repeated segments. For example, a preamble formatted according to the WiMAX communication protocol has implicit periodicity due to the fact that only every third subcarrier is modulated (the others are zero). FIG. 2 illustrates this periodicity for an arbitrary preamble sequence transmitted on segment zero. This periodicity exists when a wireless client device (i.e., mobile station) is operating in an environment where other base stations are transmitting preamble sequences on the same segments of the same channel.

When the periodicity property of the preamble sequence is used to detect the position of the transmitted preamble, it is not necessary to know the detailed information of the preamble pseudo-noise (PN) code or to search which PN code is used by the transmitting device, i.e., the base station. This saves time and computational complexity when searching the received signal for the position of the preamble, and it is a primary reason for using the periodicity property of the preambles.

However, carrier signals or DC signals in the baseband signal obtained after application of an automatic gain control (AGC) process, as well as narrow band transmitted signals also have a periodicity property. As a result, the carrier signals or DC signals in the baseband signal, or the transmitted narrow band signals may be confused with a preamble sequence and make it difficult for the receiving device to detect the position of the preamble sequence. This would delay the synchronization process in the receiving device.

Figure 3:
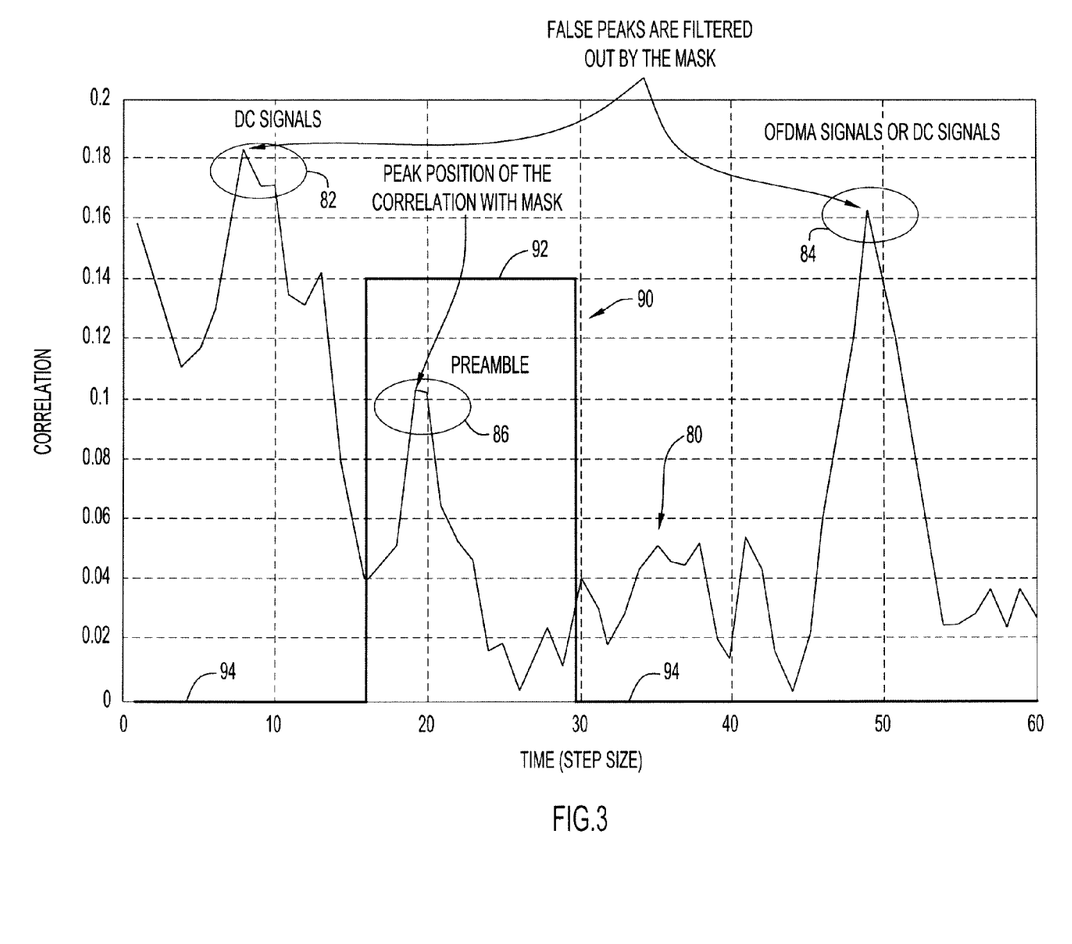
FIG. 3 is a diagram showing a portion of an auto-correlation sequence and illustrating a mask computed according to the adaptive mask preamble detection process to distinguish peaks associated with a preamble sequence from peaks associated with carrier signals or narrow band transmitted signals.

Thus, the adaptive mask preamble detection process logic 100 is designed to improve preamble detection in the presence of carrier/DC signals or narrow band signals. Referring now to FIG. 3, a diagram is shown of an example of a plot of correlation sequence 90 obtained for a received signal. The correlation sequence 80 has a peak 82 for a DC/carrier signal, a peak 84 for an orthogonal frequency division multiple access (OFDMA) signal, and a peak 86 for a preamble sequence. A mask 90 is generated by the adaptive mask preamble detection process logic 100. The mask 90 is generated such that it has a pass value (e.g., 1) at 92 for a region of the correlation sequence 80 that corresponds to a position of a peak 86 for a preamble sequence and has a reject value (e.g., 0) for all other regions shown at 94 of the correlation sequence. A "sequence" as used herein is meant to refer to a deterministic sequence of features of a signal, such as amplitude and/or phase.

Figure 4:
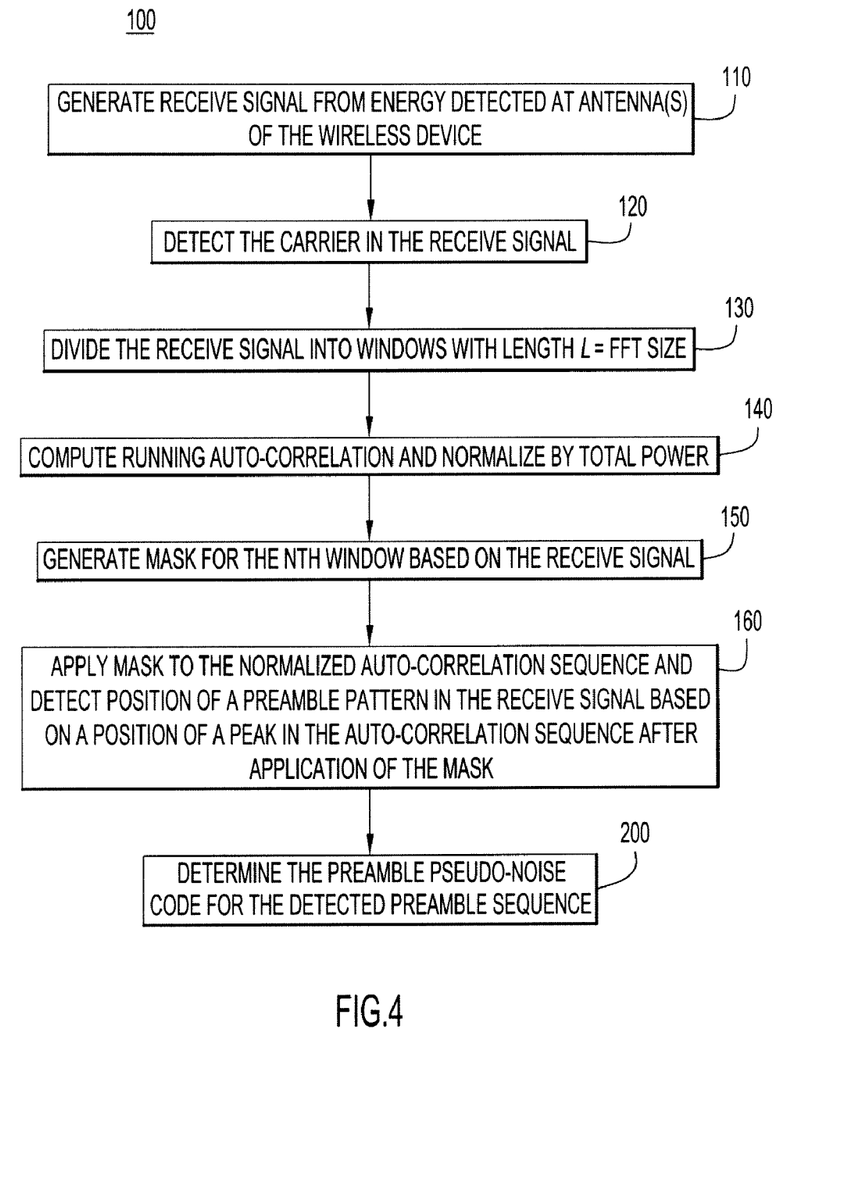
FIG. 4 is an example of a flow chart depicting the adaptive mask preamble detection process.

Turning now to FIG. 4, the adaptive mask preamble detection process logic 100 is described. This adaptive mask preamble detection process is useful for synchronization in a device that operates in an OFDMA system in the presence of carrier/DC signals or narrow band transmitted signals. An example of such a system is a WiMAX communication system, in which case, the adaptive mask preamble detection process is employed in a wireless client device (e.g., mobile station).

At 110, the wireless device generates a receive signal from energy detected at its one or more antennas. For example, in the device 20 shown in FIG. 1, the RF receiver 22 generates a baseband signal by downconverting the detected RF energy. The baseband signal is converted to a digital signal prior to processing by the modem 26. At 120, the presence of a carrier waveform in the receive signal is detected. The carrier detection allows for carrier frequency offset detection within a desired range (e.g., 16 ppm), as explained further hereinafter. Next, at 130, the receive signal is divided into windows or time intervals of a predetermined time duration. For example, each window has a length corresponding to a size L of a transform function, e.g., Fast Fourier Transform (FFT), used to convert the receive signal from the time domain to the frequency domain.

A differential auto-correlation technique is employed in which the upper $\tfrac{2}{3}^{rds}$ of the receive signal is correlated with the lower $\tfrac{2}{3}^{rds}$ of the receive signal. For example, in a window comprising 512 received time domain signals r(1:512), the correlation is taken as sum(r(1:341)*conj(r(172:512))). In other words, the first 341 samples that are in the lower ⅔ of the window are correlated with the samples in the upper ⅔ of the window. This differential auto-correlation is generally represented by the equation:

$$\Gamma(n) = \frac{3}{2} \frac{\left|\sum_{k=nM+1}^{nM+J*2} r*(k+J) \cdot r(k)\right|}{\sum_{k=1}^{L} |r(k)|^2} \quad \begin{array}{l}\text{Auto-correlation}\\ \text{Total power}\end{array}$$

It is therefore possible to detect a peak associated with a preamble sequence even without knowledge of the actual preamble sequence. In addition, the differential auto-correlation is not sensitive to frequency offsets. This allows for use of a larger step size of 750 KHz, for example, as will become apparent hereinafter. At 140, a running auto-correlation computation is made from the receive signal and the auto-correlation sequence is normalized by total power of the receive signal using the differential auto-correlation computation explained above to compute an auto-correlation to power ratio (APR) metric for window n, where $$\sum_{k=1}^{L} |r(k)|^2$$

in the denominator is the total power of the receive signal r for the window n, k is the sample index, J=round(L/3), round(x) is a Round operation to the nearest integer, and M is a sampling step size (i.e., at each step, M new samples are collected and M oldest samples are discarded). If M=1, then the running auto-correlation would be performed sample by sample. However, the step size can be made as large as 65 or 96 without performance degradation. This allows the update rate which the APR metric is computed to much lower.

There are many ways to compute the APR metric. One technique that avoids the absolute value operation uses the square APR computation as:

$$\Gamma^2(n) = \left(\frac{3}{2} \frac{\left|\sum_{k=nM+1}^{nM+2J} r*(k+J) \cdot r(k)\right|^2}{\sum_{k=1}^{L} |r(k)|^2}\right).$$

To avoid the division in the computation above, the SAPR can be calculated in the log domain as:

$$\Lambda(n) =$$

$$10\log_{10}\left(\left|\sum_{k=nM+1}^{nM+2J} r*(k+J) \cdot r(k)\right|^2\right) - 20\log_{10}\left(\sum_{k=1}^{L} |r(k)|^2\right) + 20\log_{10}\left(\frac{3}{2}\right)$$

Figure 5:
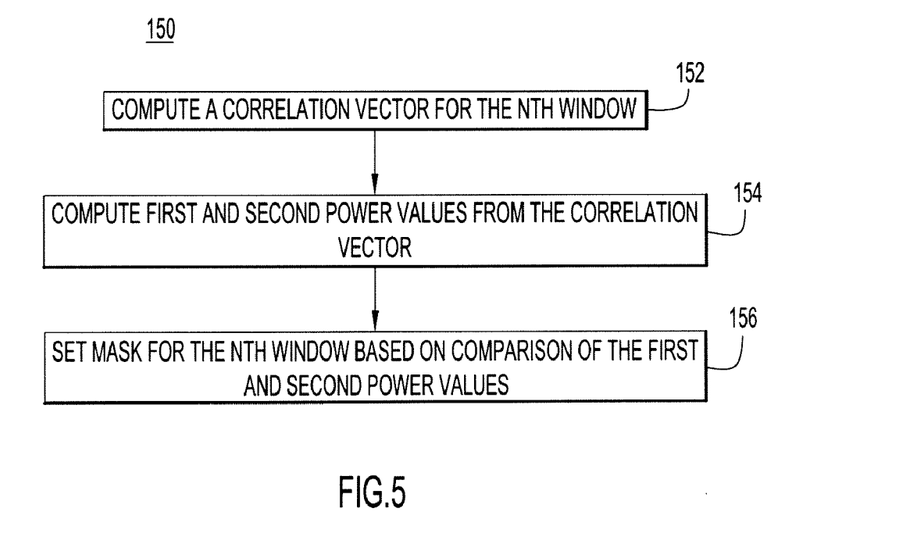
FIG. 5 is an example of a flow chart for a first technique to compute the mask.
Figure 6:
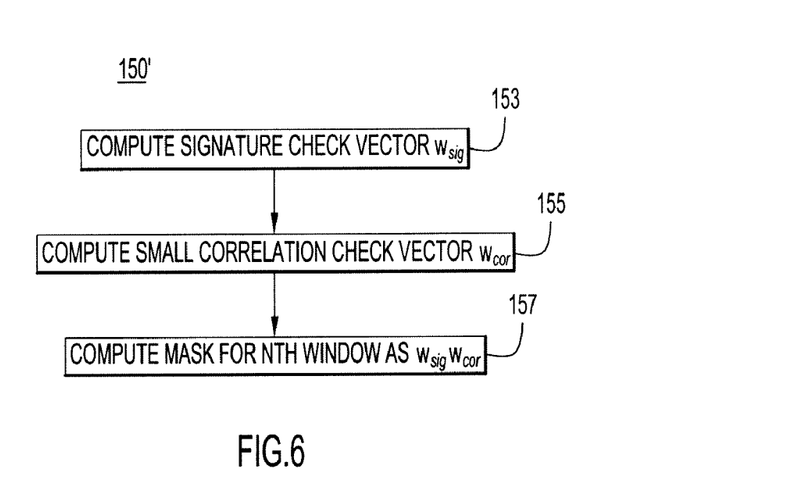
FIG. 6 is an example of a flow chart for a second technique to compute the mask.

Analysis has shown that the SAPR threshold may be set between −8 dB to −14 dB. The SAPR threshold is used to detect if correlation sequence contains a preamble sequence or other wireless signals. At 150, data representing the mask, e.g., mask 90 shown in FIG. 3, is generated for the nth window based on the receive signal. Described hereinafter in conjunction with FIGS. 5 and 6 are two techniques for generating the mask, either of which may be employed. The first technique, depicted in FIG. 5, involves somewhat more complexity but achieves better performance than the second technique depicted in FIG. 6. However, the technique of FIG. 6 is useful when computation resources are limited.

Turning now to FIG. 5, the first technique for computing the mask is now described. At 152, a correlation vector for an nth window of the receive signal is computed based on partially overlapping samples of the receive signal. The correlation vector for the nth window is computed as $\Omega_n = |\text{ifft}(\text{fftshift}(|\text{fft}(r(nM+1:nM+L))|^2))|$, where ifft denotes an inverse FFT operation, fftshift denotes shifting a zero-frequency component to center of spectrum if it does the fftshift operation at the transmitter (otherwise this operation is not needed), fft denotes an FFT operation, and r, n, M and L are as defined above. At 154, first and second power values are computed from the correlation vector, where the first and second power values correspond to at least two peaks in the correlation vector, which at least two peaks are indicative of the presence of a preamble sequence. The first power value is $\hat{P}_n = \max(\Omega_n(J-1:J+2))$ and the second power value is $\tilde{P}_n = (\text{mean}(\Omega_n(30:J-2)) + \text{mean}(\Omega_n(J+3:\text{ceil}(L/2))))/2$, where $\max(x)$ is a maximum operation, $\text{mean}(x)$ is the mean value of x, and $\text{ceil}(x)$ rounds the elements of x to the nearest integers towards infinity. At 156, values for the mask for the nth window are set based on a comparison of the first and second power values as $$\Pi_n = \begin{cases} 1 & \hat{P}_n > g\tilde{P}_n \\ 0 & \text{otherwise,} \end{cases}$$

where g is a scalar factor such as 5. In other words, a pass value (e.g., "1") for the mask is set when the first power value $\hat{P}_n$ is greater than (a multiple of) the second power value $\tilde{P}_n$, and otherwise the mask is set to a reject value ("0").

Turning now to FIG. 6, a second technique for computing the mask is shown at 150. The technique 150 relies on use of the normalized auto-correlation sequence computed at 140. At 153, a first signature parameter, also referred to herein as a signature check vector $w_{sig}$, is computed from left and right positions associated with a peak in the normalized auto-correlation sequence. Specifically, the left peak and right peak positions are computed as: $P_{left}(n) = \min(\Gamma(n-K:n))$ and $P_{right}(n) = \min(\Gamma(n:n+K))$, where K is the length of the signature check, for example, 6, or in other words the number of samples to be considered in the signature check vector. The signature check vector $w_{sig}$ is defined as:

$$w_{sig}(n) = \begin{cases} 1 & P_{left}(n) < f_1\Gamma(n) \text{ and } P_{right}(n) < f_1\Gamma(n) \\ 0 & \text{otherwise} \end{cases}$$

where $f_1$ is a scalar factor, such as ⅔.

At 155, a second signature parameter, herein also referred to as a small correlation check vector $w_{cor}$, is computed from a comparison of the normalized auto-correlation sequence $\Gamma(n)$ (computed at 140 in FIG. 4) with a modified normalized auto-correlation sequence $\hat{\Gamma}_{cor}(n)$. The modified normalized auto-correlation sequence is computed as:

$$\hat{\Gamma}_{cor}(n) = \frac{3}{2} \frac{\left| \sum_{i=1}^{N_{cor}} r*(nM + L/2 - (N_{cor} - i)N_{jump}) \cdot r(nM + L/2 + iN_{jump}) \right|}{\sum_{k=1}^{L} |r(k)|^2},$$

where $N_{cor}$ is the number of the "small amount" of receive signal samples in a group, such as 30 or 50 that are considered for this modified auto-correlation and $N_{jump}$ is the number of the subcarrier (spacing or interval) between two adjacent elements in a group of selected samples. For example, a first small group of samples is chosen as r(256−30:256) and a second small group of samples is chosen as r(257:257+30) in which $N_{jump}=1$ and for example r(256) and r(257) are two adjacent elements in one small group with spacing 1 sample, i.e., $N_{jump}=1$. Alternatively, a first small group of samples is chosen as r(256−60:2:256) and a second small group of samples is chosen as r(257:2:257+60) in which case $N_{jump}$ is equal to two and r(256) and r(258) are two adjacent elements in one small group with a spacing of 2 subcarriers.

The small correlation check vector $w_{cor}$ is then set for the nth window as $$w_{cor}(n) = \begin{cases} 1 & \Gamma(n) > f_2\hat{\Gamma}_{cor}(n) \\ 0 & \text{otherwise,} \end{cases}$$

where $f_2$ is a scaling factor based on signal-to-noise ratio (SNR) of the receive signal. At 157, the mask for the nth window is then computed by multiplying the first signature parameter, $w_{sig}$, with the second signature parameter, $w_{cor}$, i.e., $\Pi_n = w_{sig} w_{cor}$.

Referring now back to FIG. 4, using the mask computing by either the technique of FIG. 5 or the technique of FIG. 6, the position of the preamble sequence is detected. Specifically, the mask $\Pi_n$ is applied to the normalized auto-correlation sequence $\Gamma(n)$ to filter out portions of the auto-correlation sequence that are outside of the mask and a position of the preamble sequence in the receive signal (i.e., in which window over all windows n) is detected based on a position of a peak in the auto-correlation sequence after application of the mask. The position of the peak may be determined by the computation $$n_{peak} = \underset{n}{\operatorname{argmax}}(\Gamma^2(n)\Pi_n) \text{ or the computation } n_{peak} = \underset{n}{\operatorname{argmax}}(\Lambda(n)\Pi_n).$$

Once the position of the peak, and hence the window position of the preamble sequence, is determined at 160, the preamble PN code is determined at 200.

Figure 7:
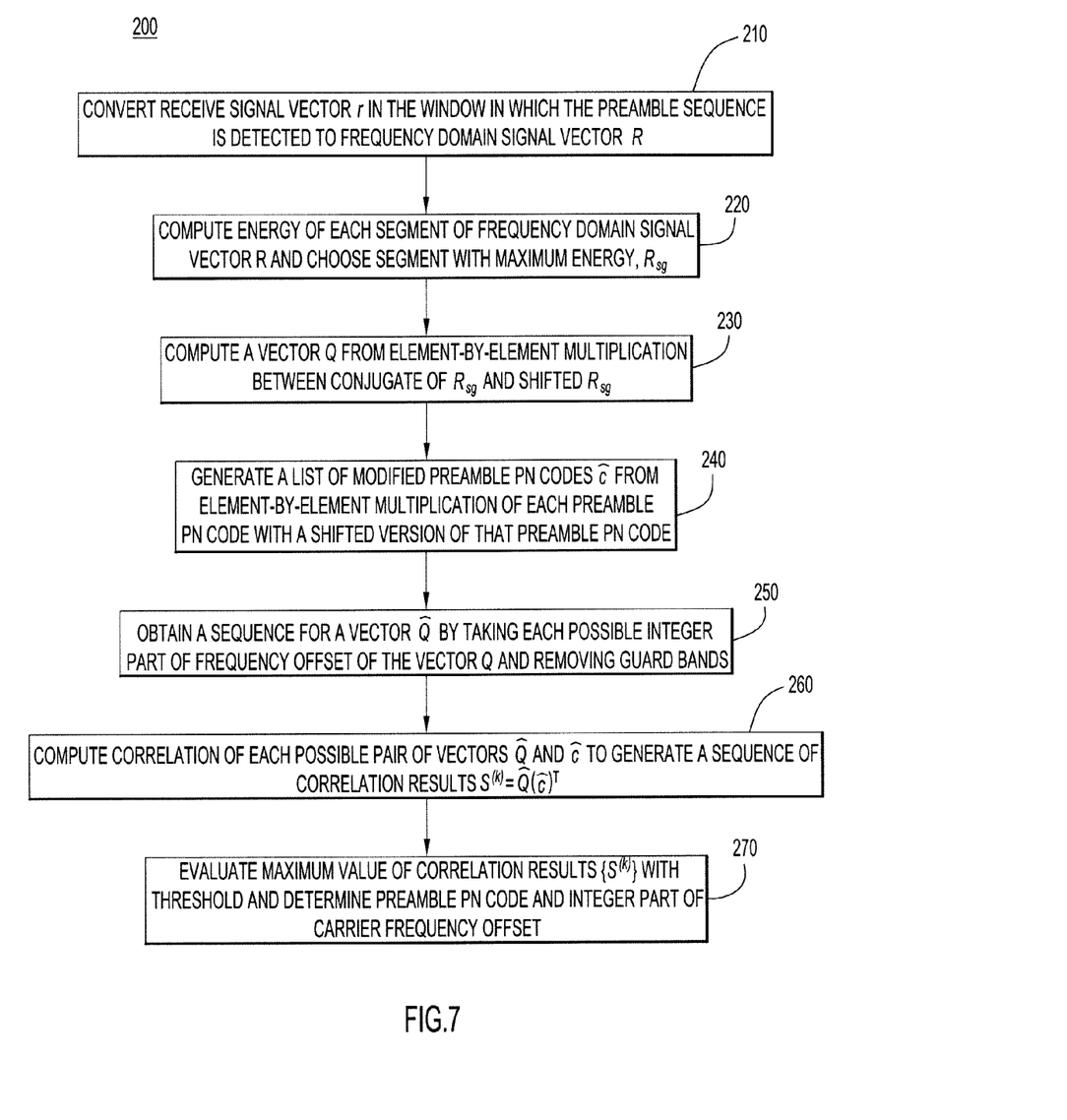
FIG. 7 is an example of a flow chart for determining the pseudo-noise sequence of a detected preamble sequence.
Figure 8:
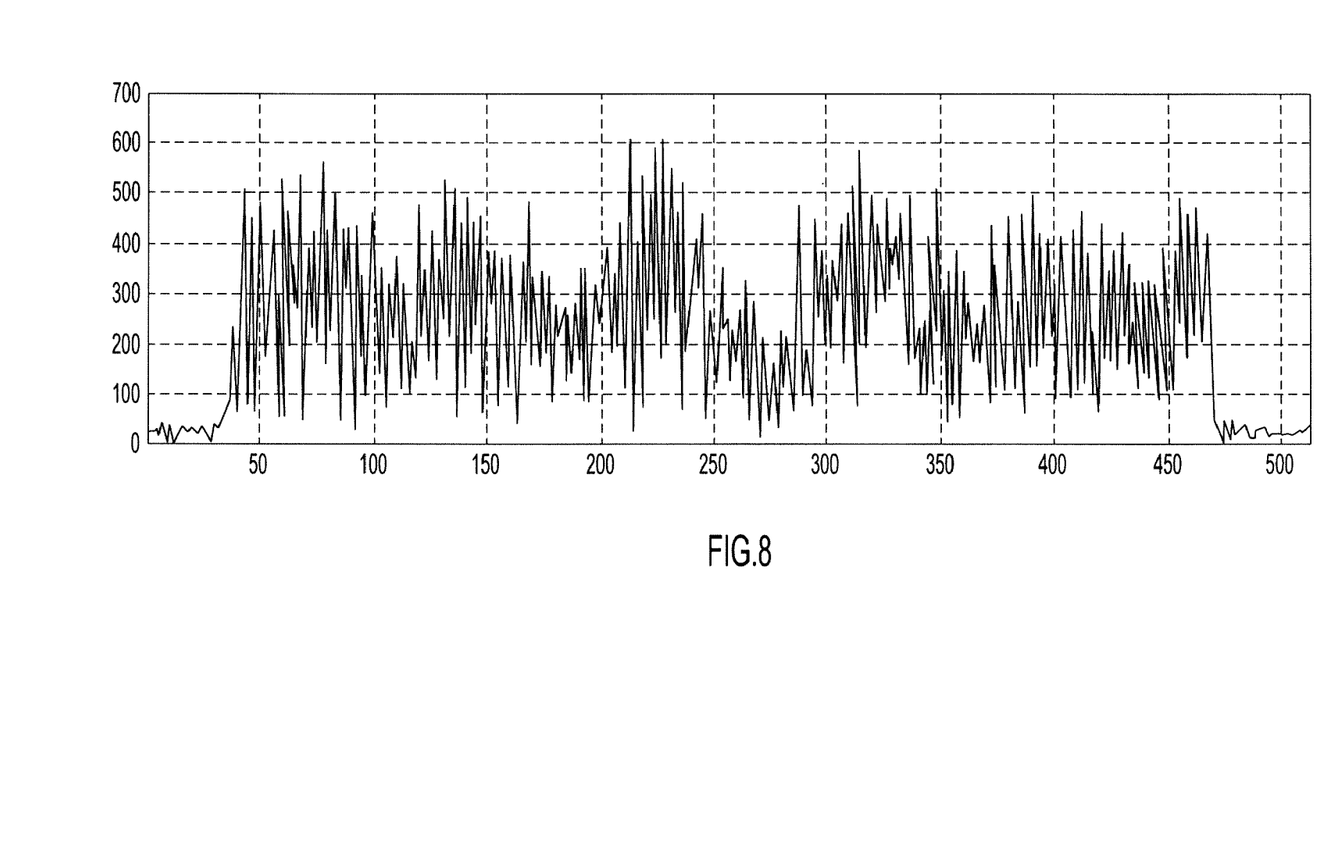
FIG. 8 is a plot showing an example of a frequency domain signal vector that is analyzed by the process depicted by the flow chart of FIG. 7.

Turning now to FIG. 7, one technique for determining the PN code of the detected preamble sequence is described. At 210, the receive signal (vector) r is converted from a time domain signal to a frequency domain signal vector R. For example, the frequency domain receive signal vector R is computed as $R = \text{FFT}(r(n_{peak}M+1:n_{peak}M+L)) = [R(1), R(2), \ldots, R(L)]$, where $n_{peak}$, M and L are as defined above. FIG. 8 illustrates an example of a frequency domain signal vector R for a window based on an FFT size of 512. At 220, the energy of each segment of the frequency domain signal vector R is computed and the segment with the maximum energy $R_{sg}$ among the plurality of segments is identified. Each of the plurality of segments of the frequency domain signal vector R corresponds to one of a plurality of subcarrier positions associated with an OFDMA signal format and represents a preamble sequence received in a frequency selection channel with some frequency offset. For example, $N_{sg} = \max_j E_{sg}^{(j)}$, where j and $N_{sg} \in \{0,1,2\}$ corresponding to the subcarrier positions $\{0,1,2\}$, and $$E_{sg}^{(j)} = \sum_{n=0}^{\lfloor (L-j-1)/3 \rfloor} |R(3n+j+1)|^2$$

where $\lfloor \; \rfloor$ is the floor operator. The frequency domain receive signal vector for the segment with the maximum energy is denoted $R_{sg} = [R(i+1), R(3+i+1), \ldots, R(3 \times \lfloor (L-i-1)/3 \rfloor + i+1)]$, where $i = N_{sg}$.

Figure 9:
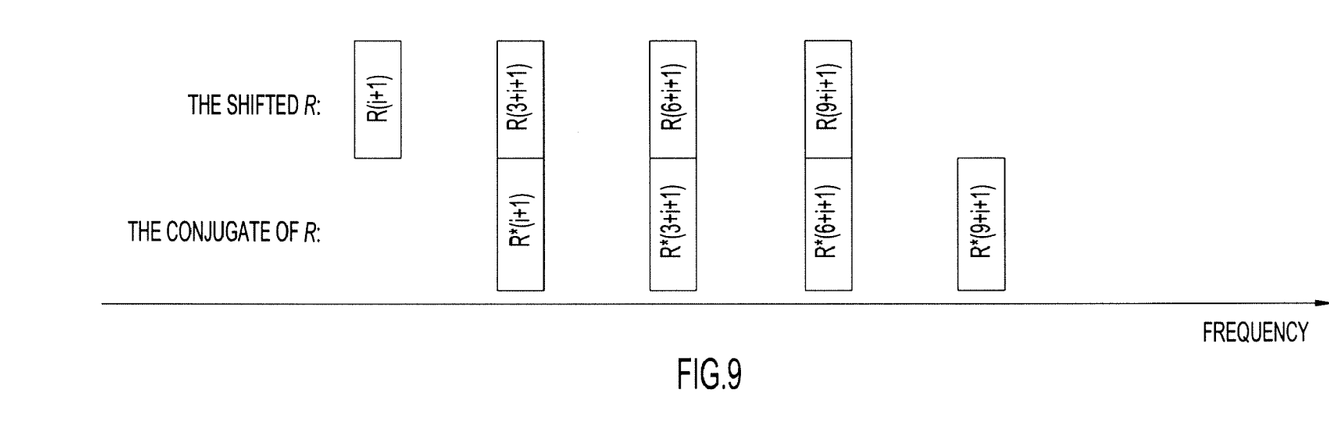
FIG. 9 is a diagram depicting a multiplication function associated with a frequency domain signal vector as part of the functions depicted in the flow chart of FIG. 7.

Next, at 230, a vector Q is computed from an element-by-element multiplication of a conjugate of a vector $R_{sg}$ and a frequency shifted version of the vector $R_{sg}$. For example, the vector Q is computed as $Q = [R^*(i+1)R(3+i+1), R^*(3+i+1)R(6+i+1), \ldots, R^*(3 \times (\lfloor (L-i-1)/3 \rfloor - 1) + i+1)R(3 \times \lfloor (L-i-1)/3 \rfloor + i+1)]$ where * denotes the conjugate operator. FIG. 9 illustrates the multiplication function at 230, where the shifted version of $R_{sg}$ is shifted by a frequency index of 3. The purpose of created the shifted version of $R_{sg}$ is to account for phase variation aspects of the over-the-air channel. At 240, a list of modified preamble PN codes ĉ are generated from element-by-element multiplication of each preamble PN code with a shifted version of that PN code such that for a PN code $c = [c(1), c(2), \ldots, c(N_{PN})]$, the modified preamble PN code is $ĉ = [c(1)c(2), c(2)c(3), \ldots, c(N_{PN}-1)c(N_{PN})]$ where $N_{PN}$ is a number of the binary bits (1 or −1) in a preamble PN code. At 250, a sequence for a vector $\hat{Q}$ is obtained from each possible integer part of a frequency offset of the vector Q after removing guard bands of the vector Q. For example, when the FFT size is 512, the vector Q may include 512/3=170 or 171 elements. Each vector $\hat{Q}$ is therefore a vector of 143 elements after guard band subcarriers are taken into consideration. Based on the range of possible frequency offsets, $\hat{Q}$ could be equal to Q(15:15+143−1) or Q(14:14+143−1) or Q(16:16+143−1) or Q(13:13+143−1) or Q(17:17+143−1).

Figure 10:
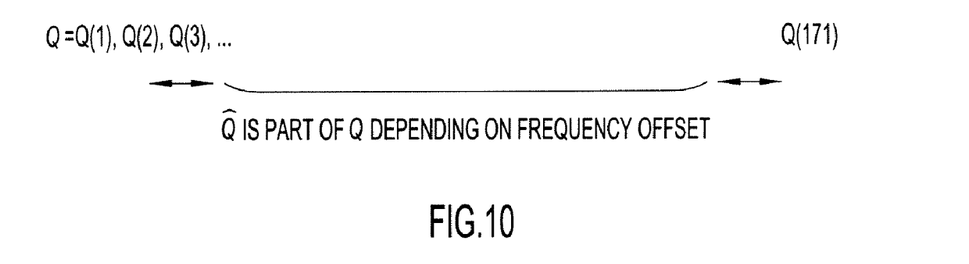
FIG. 10 is a diagram depicting generation of a vector according to one function of the adaptive mask preamble detection process.

FIG. 10 generally depicts how the vector $\hat{Q}$ is derived from the vector Q. For example, if the possible integer of frequency offset is 0 subcarrier band, the guard band on the left is 42/3=14 subcarriers and as a result $\hat{Q} = [Q(15), Q(16), \ldots, Q(14+143)]$, if the possible integer of frequency offset is −1 subcarrier, then the guard band on the left is 13 and consequently $\hat{Q}[Q(14), Q(15), \ldots, Q(13+143)]$, and so on.

At 260, a correlation is computed with respect to each possible pair of vectors $\hat{Q}$ and ĉ to generate a sequence of correlation results $S^{(k)} = \hat{Q}(ĉ)^T$, where T denotes a transpose operation and k denotes a kth correlation result. At 270, a maximum value of the correlation results $\{S^{(k)}\}$ is evaluated with respect to a threshold to determine a pseudo-noise code and carrier frequency offset for the detected preamble sequence. For example, the integer of carrier frequency offset is $3N_{offset} + N_{sg} - s_g^{(c)}$, where $N_{sg}^{(c)} \in \{0,1,2\}$ is the segment number of the detected PN code ĉ, $N_{offset} \in \{-2,-1,0,1,2\}$ is the shifted number representing the carrier frequency offset in the example where the carrier frequency offset is in the range of [−6, 6] subcarrier spacing. The preamble PN code contained in the receive signal vector is determined as well as the position in the receive signal vector. Each kth correlation result will be a one to one mapping to the index of a PN code and the real segment. When the maximum value of the correlation result vector $\{S^{(k)}\}$ corresponding to $k_{max}$ is computed, the corresponding index of PN code is determined according to the equation $$k_{max} = \operatorname*{argmax}_{k} S^{(k)}.$$

By combining adaptive masks with the autocorrelation process in the time domain and the correlation process for preamble sequence detection in the frequency domain, techniques disclosed herein significantly improves performance of the sequence (preamble) detection with relatively low computation complexity in the case of existing carrier/DC signals or narrow band transmitted signals. These techniques may be used to detect preamble sequences as well as other sequences, such as ranging sequences, sounding sequences, etc., in some wireless communication systems. For example, some preamble and ranging sequences used in the IEEE 802.11 communication protocols have a periodicity property that can be exploited by the techniques described herein.

Although the apparatus, logic, and method are illustrated and described herein as embodied in one or more specific examples, it is nevertheless not intended to be limited to the details shown, since various modifications and structural changes may be made therein without departing from the scope of the apparatus, method, and logic and within the scope and range of equivalents of the claims. Accordingly, it is appropriate that the appended claims be construed broadly and in a manner consistent with the scope of the apparatus, logic, and method, as set forth in the following claims.

What is claimed is:

1. A method comprising:
   at a wireless communication device, receiving energy in a frequency band and generating a receive signal representing the received energy;
   dividing the receive signal into windows of a predetermined time duration;
   computing a running auto-correlation of the receive signal to produce an auto-correlation sequence for a sequence to be detected in the receive signal;
   generating data representing a mask for a window based on the receive signal by computing a correlation vector for a window of the receive signal based on partially overlapping samples of the receive signal, computing first and second power values from the correlation vector corresponding to at least two peaks in the correlation vector, which at least two peaks are indicative of the presence of the sequence in the receive signal, comparing the first and second power values with each other, and setting a pass value for the mask when the first power value is greater than the second power value and otherwise setting a reject value for the mask;
   applying the mask to the auto-correlation sequence to filter out portions of the auto-correlation sequence that are outside of the mask; and
   detecting a position of a sequence in the receive signal based on a position of a peak in the auto-correlation sequence after application of the mask.

2. The method of claim 1, wherein dividing comprises dividing the receive signal into windows such that the predetermined time duration corresponds to a length of a transform function used to convert the receive signal from the time domain to the frequency domain.

3. The method of claim 1, wherein computing the correlation vector comprises computing the correlation vector for a nth window as $\Omega_n = |\text{ifft}(\text{fftshift}(|\text{fft}(r(nM+1:nM+L))|^2))|$, where ifft denotes an inverse Fast Fourier Transform (FFT) operation, fftshift denotes shifting a zero-frequency component to a center of a spectrum when a fftshift operation is performed at a transmitter, fft denotes an FFT operation, r denotes a receive signal vector, n is a window index, M is a sampling step size, and L corresponds to a size of the FFT operation, and wherein computing the first and second power values comprises computing the first power value as $\hat{P}_n = \max(\Omega_n(J-1:J+2))$ and the second power value as $\tilde{P}_n = (\text{mean}(\Omega_n(30:J-2)) + \text{mean}(\Omega_n(J+3:\text{ceil}(L/2))))/2$, where max(x) is a maximum operation, mean(x) is the mean value of x, and ceil(x) rounds the elements of x to the nearest integers towards infinity, and wherein setting comprises setting the mask $$\Pi_n = \begin{cases} 1 & \hat{P}_n > g\tilde{P}_n \\ 0 & \text{otherwise} \end{cases}$$

where g is a scalar.

4. The method of claim 1, and further comprising:
determining a pseudo-noise code for the detected sequence, wherein determining the pseudo-noise code comprises:
converting the receive signal for the window in which the sequence is detected from a time domain signal to a frequency domain signal;
computing energy in each of a plurality of segments of the frequency domain signal, wherein each segment corresponds to one of a plurality of subcarrier positions associated with an orthogonal frequency division multiplexed signal format;
identifying the segment of the frequency domain signal with maximum energy among the plurality of segments;
computing a vector Q from an element-by-element multiplication of a conjugate of a vector $R_{sg}$ that represents the segment of the frequency domain signal with maximum energy and a frequency shifted version of the vector $R_{sg}$;
generating a list of modified pseudo-noise codes ĉ from element-by-element multiplication of each pseudo-noise code with a shifted version of that pseudo-noise code such that for a pseudo-noise code $c=[c(1), c(2), \ldots, c(N_{PN})]$, the modified pseudo-noise code is $\hat{c}=[c(1)c(2), c(2)c(3), \ldots, c(N_{PN}-1)c(N_{PN})]$, where $N_{PN}$ is a number of the binary bits in a pseudo-noise code;
generating a sequence for a vector $\hat{Q}$ obtained from each possible integer part of a frequency offset of the vector Q after removing guard bands of the vector Q;
computing a correlation with respect to each possible pair of vectors $\hat{Q}$ and ĉ to generate a sequence of correlation results $S^{(k)} = \hat{Q}(\hat{c})^T$, where T denotes a transpose operation and k denotes a kth correlation result; and
evaluating a maximum value of the correlation results $\{S^{(k)}\}$ with respect to a threshold and determining therefrom a pseudo-noise code and carrier frequency offset for the detected sequence.

5. A method comprising:
at a wireless communication device, receiving energy in a frequency band and generating a receive signal representing the received energy;
dividing the receive signal into windows of a predetermined time duration;
computing a running auto-correlation of the receive signal to produce an auto-correlation sequence for a sequence to be detected in the receive signal;
generating data representing a mask for a window based on the receive signal;
applying the mask to the auto-correlation sequence to filter out portions of the auto-correlation sequence that are outside of the mask; and
detecting a position of a sequence in the receive signal based on a position of a peak in the auto-correlation sequence after application of the mask,
wherein computing the running auto-correlation sequence comprises computing a normalized auto-correlation sequence that is a function of the total power of the receive signal for the each respective window and a correlation correction value that is based on a number of receive signal samples in a group that are to be considered for computing the normalized auto-correlation sequence.

6. The method of claim 5, wherein generating data representing the mask comprises computing from the normalized auto-correlation sequence a first signature parameter from left and right positions associated with a peak in the auto-correlation sequence, computing a second signature parameter from comparison of the normalized auto-correlation sequence with a modified normalized correlation sequence computed over a relatively small number of samples of the receive signal, and multiplying the first signature parameter with the second signature parameter to produce the data for the mask.

7. The method of claim 6, wherein computing the first signature parameter comprises computing left and right positions associated with a peak in the normalized auto-correlation sequence such that $P_{left}(n) = \min(\Gamma(n-K:n))$ and $P_{right}(n) = \min(\Gamma(n:n+K))$ right, where K is a number of samples considered in the first signature parameter, such that the first signature parameter is represented by a vector $w_{sig}$, where $$w_{sig}(n) = \begin{cases} 1 & P_{left}(n) < f_1\Gamma(n) \\ 0 & \text{otherwise} \end{cases}$$

and $P_{right}(n) < f_1\Gamma(n)$ and $f_1$ is a scalar factor, and wherein computing the second signature parameter comprises computing the modified auto-correlation sequence as $$\hat{\Gamma}_{cor}(n) = \frac{3}{2} \frac{\left| \sum_{i=1}^{N_{cor}} r*(nM + L/2 - (N_{cor} - i)N_{jump}) \cdot r(nM + L/2 + iN_{jump}) \right|}{\sum_{k=1}^{L} |r(k)|^2},$$

where $N_{cor}$ is a number samples in a group and $N_{jump}$ is the number of subcarriers between adjacent elements in a group of samples, such that the second signature parameter represented by the vector $w_{cor}$ is computed as $$w_{cor}(n) = \begin{cases} 1 & \Gamma(n) > f_2\hat{\Gamma}_{cor}(n) \\ 0 & \text{otherwise,} \end{cases}$$

where $f_2$ is a scaling factor based on signal-to-noise ratio of the receive signal.

8. The method of claim 5, wherein computing the running auto-correlation sequence comprises computing the normalized auto-correlation sequence in accordance with $$\Lambda(n) = 10\log_{10}\left(\left|\sum_{k=nM+1}^{nM+2J} r*(k+J)\cdot r(k)\right|^2\right) - 20\log_{10}\left(\sum_{k=1}^{L} |r(k)|^2\right) + 20\log_{10}\left(\frac{3}{2}\right),$$

where $$\sum_{k=1}^{L} |r(k)|^2$$

is the total power of the receive signal r for the window n, k is a sample index, J=round(L/3), round(x) is a round operation to the nearest integer, and M is a sampling step size.

9. The method of claim 5, wherein computing the running auto-correlation sequence comprises computing the normalized auto-correlation sequence in accordance with $$\Gamma^2(n) = \left(\frac{3}{2}\frac{\left|\sum_{k=nM+1}^{nM+2J} r*(k+J)\cdot r(k)\right|^2}{\sum_{k=1}^{L} |r(k)|^2}\right),$$

where $$\sum_{k=1}^{L} |r(k)|^2$$

is the total power of the receive signal r for the window n, k is a sample index, J=round(L/3), round(x) is a round operation to the nearest integer, and M is a sampling step size.

10. An apparatus comprising:
a radio receiver configured to receive energy in a frequency band and to generate a receive signal representing the received energy;
a baseband signal processor configured to be coupled to the radio receiver, wherein the baseband signal processor is configured to:
  divide the receive signal into windows of a predetermined time duration;
  compute a running auto-correlation of the receive signal to produce an auto-correlation sequence for a sequence to be detected in the receive signal;
  generate data representing a mask for a window based on the receive signal by computing a correlation vector for a window of the receive signal based on partially overlapping samples of the receive signal, computing first and second power values from the correlation vector corresponding to at least two peaks in the correlation vector, which at least two peaks are indicative of the presence of the sequence, comparing the first and second power values with each other, and setting a pass value for the mask when the first power value is greater than the second power value and otherwise setting a reject value for the mask;
  apply the mask to the auto-correlation sequence to filter out portions of the auto-correlation sequence that are outside of the mask; and
  detect a position of a sequence in the receive signal based on a position of a peak in the auto-correlation sequence after application of the mask.

11. The apparatus of claim 10, wherein the baseband signal processor is configured to divide the receive signal into windows such that the predetermined time duration corresponds to a length of a transform function used to convert the receive signal from the time domain to the frequency domain.

12. The apparatus of claim 10, wherein the baseband signal processor is further configured to determine a pseudo-noise code for the detected sequence by:
  converting the receive signal for the window in which the sequence is detected from a time domain signal to a frequency domain signal;
  computing energy in each of a plurality of segments of the frequency domain signal, wherein each segment corresponds to one of a plurality of subcarrier positions associated with an orthogonal frequency division multiplexed signal format;
  identifying the segment of the frequency domain signal with maximum energy among the plurality of segments;
  computing a vector Q from an element-by-element multiplication of a conjugate of a vector $R_{sg}$ that represents the segment of the frequency domain signal with maximum energy and a frequency shifted version of the vector $R_{sg}$;
  generating a list of modified pseudo-noise codes c from element-by-element multiplication of each pseudo-noise code with a shifted version of that pseudo-noise code such that for a pseudo-noise code c=[c(1), c(2), . . . , c($N_{PN}$)], the modified pseudo-noise code is ĉ=[c(1)c(2), c(2)c(3), . . . , c($N_{PN}$−1)c($N_{PN}$)], where $N_{PN}$ is a number of the binary bits in a pseudo-noise code;
  generating a sequence for a vector $\hat{Q}$ obtained from each possible integer part of a frequency offset of the vector Q after removing guard bands of the vector Q;
  computing a correlation with respect to each possible pair of vectors $\hat{Q}$ and ĉ to generate a sequence of correlation results $S^{(k)}=\hat{Q}(ĉ)^T$, where T denotes a transpose operation and k denotes a kth correlation result; and
  evaluating a maximum value of the correlation results $\{S^{(k)}\}$ with respect to a threshold and determining therefrom a pseudo-noise code and carrier frequency offset for the detected sequence.

13. An apparatus comprising:
a radio receiver configured to receive energy in a frequency band and to generate a receive signal representing the received energy;
a baseband signal processor configured to be coupled to the radio receiver, wherein the baseband signal processor is configured to:
  divide the receive signal into windows of a predetermined time duration;
  compute a running auto-correlation of the receive signal to produce an auto-correlation sequence for a sequence to be detected in the receive signal;
  generate data representing a mask for a window based on the receive signal;
  apply the mask to the auto-correlation sequence to filter out portions of the auto-correlation sequence that are outside of the mask; and detect a position of a sequence in the receive signal based on a position of a peak in the auto-correlation sequence after application of the mask, wherein the baseband signal processor is configured to compute the running auto-correlation sequence by computing a normalized auto-correlation sequence that is a function of the total power of the receive signal for the each respective window and a correlation correction value that is based on a number of receive signal samples in a group that are to be considered for computing the normalized auto-correlation sequence.

14. The apparatus of claim 13, wherein the baseband signal processor is configured to compute the normalized auto-correlation sequence in accordance with $$\Gamma^2(n) = \left( \frac{3}{2} \frac{\left| \sum_{k=nM+1}^{nM+2J} r*(k+J) \cdot r(k) \right|^2}{\sum_{k=1}^{L} |r(k)|^2} \right),$$

where $$\sum_{k=1}^{L} |r(k)|^2$$

is the total power of the receive signal r for the window n, k is a sample index, J=round(L/3), round(x) is a round operation to the nearest integer, and M is a sampling step size.

15. A non-transitory computer readable media including logic, wherein the computer readable media, when executed on a computer, causes the computer to:
at a wireless communication device, receive energy in a frequency band and generating a receive signal representing the received energy;
divide the receive signal into windows of a predetermined time duration;
compute a running auto-correlation of the receive signal to produce an auto-correlation sequence for a sequence to be detected in the receive signal;
generate data representing a mask for a window based on the receive signal by computing a correlation vector for a window of the receive signal based on partially overlapping samples of the receive signal, computing first and second power values from the correlation vector corresponding to at least two peaks in the correlation vector, which at least two peaks are indicative of the presence of the sequence, comparing the first and second power values with each other, and setting a pass value for the mask when the first power value is greater than the second power value and otherwise setting a reject value for the mask;
apply the mask to the auto-correlation sequence to filter out portions of the auto-correlation sequence that are outside of the mask; and
detect a position of a sequence in the receive signal based on a position of a peak in the auto-correlation sequence after application of the mask.

16. The computer readable media of claim 15, wherein the logic that divides is configured to divide the receive signal into windows such that the predetermined time duration corresponds to a length of a transform function used to convert the receive signal from the time domain to the frequency domain.

17. The computer readable media of claim 15, wherein the logic that computes the running auto-correlation sequence comprises logic that computes a normalized auto-correlation sequence for each window.

18. The computer readable media of claim 15, further comprising logic configured to:
determine a pseudo-noise code for the detected sequence, comprising logic configured to:
convert the receive signal for the window in which the sequence is detected from a time domain signal to a frequency domain signal;
compute energy in each of a plurality of segments of the frequency domain signal, wherein each segment corresponds to one of a plurality of subcarrier positions associated with an orthogonal frequency division multiplexed signal format;
identify the segment of the frequency domain signal with maximum energy among the plurality of segments;
compute a vector Q from an element-by-element multiplication of a conjugate of a vector $R_{sg}$ that represents the segment of the frequency domain signal with maximum energy and a frequency shifted version of the vector $R_{sg}$;
generate a list of modified pseudo-noise codes ĉ from element-by-element multiplication of each pseudo-noise code with a shifted version of that pseudo-noise code such that for a pseudo-noise code c=[c(1), c(2), ..., c($N_{PN}$)], the modified pseudo-noise code is ĉ=[c(1)c(2), c(2)c(3), ..., c($N_{PN}$−1)c($N_{PN}$)], where $N_{PN}$ is a number of the binary bits in a pseudo-noise code;
generate a sequence for a vector $\hat{Q}$ obtained from each possible integer part of a frequency offset of the vector Q after removing guard bands of the vector Q;
compute a correlation with respect to each possible pair of vectors $\hat{Q}$ and ĉ to generate a sequence of correlation results $S^{(k)}=\hat{Q}(\hat{c})^T$, where T denotes a transpose operation and k denotes a kth correlation result; and
evaluate a maximum value of the correlation results $\{S^{(k)}\}$ with respect to a threshold to determine therefrom a pseudo-noise code and carrier frequency offset for the detected sequence.

19. A non-transitory computer readable media including logic, wherein the computer readable media, when executed on a computer, causes the computer to:
at a wireless communication device, receive energy in a frequency band and generate a receive signal representing the received energy;
divide the receive signal into windows of a predetermined time duration;
compute a running auto-correlation of the receive signal to produce an auto-correlation sequence for a sequence to be detected in the receive signal;
generate data representing a mask for a window based on the receive signal;
apply the mask to the auto-correlation sequence to filter out portions of the auto-correlation sequence that are outside of the mask; and
detect a position of a sequence in the receive signal based on a position of a peak in the auto-correlation sequence after application of the mask, wherein the logic that computes the running auto-correlation sequence comprises logic that computes a normalized auto-correlation sequence for each window, and wherein the logic that generates the data for the mask comprises logic that is configured to compute from the normalized auto-correlation sequence a first signature parameter from left and right positions associated with a peak in the auto-correlation sequence, compute a second signature parameter from comparison of the normalized auto-correlation sequence with a modified normalized correlation sequence computed over a relatively small number of samples of the receive signal, and multiply the first signature parameter with the second signature parameter to produce the data for the mask.

* * * * *